US011451255B2

(12) United States Patent
Manivannan et al.

(10) Patent No.: US 11,451,255 B2
(45) Date of Patent: Sep. 20, 2022

(54) MODULAR COMMUNICATIONS SYSTEMS WITH DYNAMICALLY POSITIONABLE ANTENNA ELEMENTS

(71) Applicant: VORBECK MATERIALS CORP., Jessup, MD (US)

(72) Inventors: Sriram Manivannan, Baltimore, MD (US); James Brent, Burlington, VT (US); Josh Desportes, Jessup, MD (US); James Turney, Silver Spring, MD (US); Alison Bakersville, Jessup, MD (US); Can Gun Yaprak, Halethorpe, MD (US)

(*) Notice: Subject to any disclaimer, the term of this patent is extended or adjusted under 35 U.S.C. 154(b) by 0 days.

(21) Appl. No.: 17/382,059

(22) Filed: Jul. 21, 2021

(65) Prior Publication Data

US 2022/0085842 A1 Mar. 17, 2022

Related U.S. Application Data

(63) Continuation of application No. 16/798,712, filed on Feb. 24, 2020, now Pat. No. 11,101,835.

(60) Provisional application No. 62/861,974, filed on Jun. 14, 2019.

(51) Int. Cl.
  *H04B 1/3827* (2015.01)
  *H01Q 1/27* (2006.01)
  *A41D 1/00* (2018.01)
  *A41D 1/04* (2006.01)

(52) U.S. Cl.
  CPC ............ *H04B 1/385* (2013.01); *A41D 1/002* (2013.01); *A41D 1/005* (2013.01); *H01Q 1/273* (2013.01); *A41D 1/04* (2013.01)

(58) Field of Classification Search
  CPC ..................................................... H04B 1/385
  See application file for complete search history.

(56) References Cited

U.S. PATENT DOCUMENTS

| 7,658,901 B2 | 2/2010 | Prud'Homme et al. |
| 9,913,374 B2 | 3/2018 | Crain et al. |
| 2008/0083720 A1* | 4/2008 | Gentile ............... A43B 3/35 219/211 |
| 2016/0149293 A1* | 5/2016 | Walker ............... H01Q 19/30 343/718 |
| 2020/0395970 A1 | 12/2020 | Manivannan et al. |

* cited by examiner

*Primary Examiner* — Hsinchun Liao
(74) *Attorney, Agent, or Firm* — Trentice V. Bolar, Esq.

(57) ABSTRACT

A modular communications system having dynamically positionable non-metallic antenna elements and communications devices is disclosed. The system includes an apparel item with a surface and a foam layer positioned therein. Landing pads are each uniquely positioned on the surface. The antenna elements are demountably, intermittingly, and conductively coupled to the landing pads; includes a non-metallic conductive composition; and a unique operational frequency. A hub is positioned on the surface and conductively coupled to each landing pad. Each communications device is demountably affixed to the surface; intermittingly, demountably, and conductively coupled to the hub; and includes a unique operational frequency. The hub intermittingly, demountably, and conductively couples each communications devices to a unique landing pad included in the plurality of landing pads. The foam layer is lined with a conductive material that reflects RF radiation that emanates from the plurality of non-metallic antenna elements.

20 Claims, 6 Drawing Sheets

MODULAR COMMUNICATIONS SYSTEMS WITH DYNAMICALLY POSITIONABLE ANTENNA ELEMENTS

CROSS-REFERENCE TO RELATED APPLICATIONS

This application is a continuation of U.S. patent application Ser. No. 16/798,712 filed Feb. 24, 2020, which claims the benefit of U.S. Provisional Application No. 62/861,974 filed Jun. 14, 2019. The applications are hereby incorporated herein by reference.

TECHNICAL FIELD

Background

The present invention relates generally to communications systems and specifically to modular communications systems with dynamically positionable antenna elements.

DETAILED DESCRIPTION

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made, with the terms "inward," "inner," "interior," or "inboard" and "outward," "outer," "exterior," or "outboard" referring, respectively, to directions toward and away from the center of the referenced element, the terms "radial" or "horizontal" and "axial" or "vertical" referring, respectively, to directions or planes which are perpendicular, in the case of radial or horizontal, or parallel, in the case of axial or vertical, to the longitudinal central axis of the referenced element, and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

The present invention relates generally to communications systems and specifically to modular communications systems having dynamically positionable antenna elements and communications devices.

Embodiments of the present invention seek to provide modular communications systems. Other aspects of the present invention seek to provide wearable modular communications systems having dynamically positionable antenna elements and communications devices. As used herein, "dynamically positionable" antennas elements refers to antenna elements that can be demountably coupled to the wearable at two or more positioned thereon.

Hand-held (i.e. portable) communications systems, such as walkie-talkies and other portable radio transceiver, are typically used by military personnel, law enforcement officials, first responders, as well as civilians. However, such systems typically utilize one or more conspicuous antennas, such as whip antennas, which typically consist of a straight flexible metal wire or rod. The bottom end of whip antennas are coupled to the radio receiver, transmitter, or transceiver. Whip antennas are typically designed to be flexible to reduce breaking.

However, such antennas are increasingly deployed in environments where identification of the communications personnel and/or their locations may not be desired (e.g., military theaters and clandestine operations). Even more, such antennas are typically vulnerable to entanglement in foliage or debris, and damage in disaster and emergency, as well as high population density environments.

Figure 1:
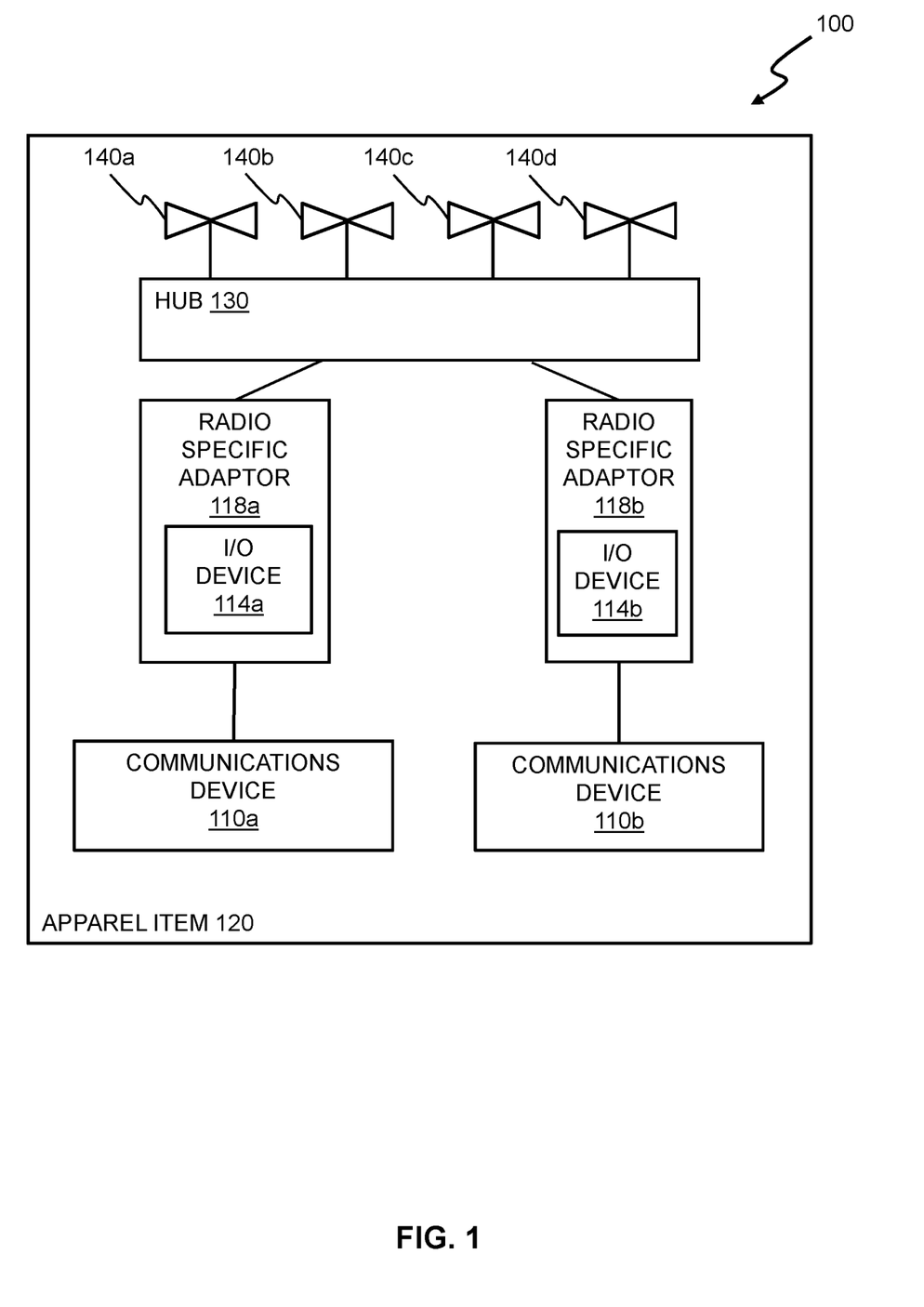
FIG. 1 depicts a block diagram of a modular communications system, in accordance with an embodiment of the present invention.

FIG. 1 depicts a block diagram of a modular communications system, generally 100, in accordance with some embodiments. Modular communications system 100, in certain embodiments, can include one or more communications devices 110 conductively coupled to hub 130 via a radio specific adaptor positioned adjacent to apparel item 120. Applicable apparel item 120 includes, but are not limited to, form fitting apparel items, undergarments (e.g., apparel items configured to be worn on the torso or lower extremities under other garments), outerwear (e.g., coat, cloak, jacket, hoodie, pants, footwear, smock, apron, poncho, and other apparel items configured to be worn on the upper and/or lower torso of a human, canine, cat, other mammals), and harnesses. In certain embodiments, apparel item 120 can be any substrate that can be demountably affixed to a user (e.g., user 300).

For example, communications devices 110a and 110b include similar components having similar connectivities and functionalities. In still other embodiments, the hub 130 can also be conductively coupled to antenna elements 140. In some embodiments, communications device 110 is a portable communications device that can send and/or receive radio transmissions with other communications devices. In still other embodiments, communications device 110 can include a plurality of devices interoperably connected to perform one or more functions, steps, and/or processes of communications device 110. For example, communications device 110 is a portable communications device, such as a walkie-talkie or other two-way communications device.

In several embodiments, communications device 110 communicates via one or more antenna elements 140 (e.g., send and/or receive data modulated via one or more communications protocols known in the art). For example, applicable communication protocols can include, but are not limited to, UHF, VHF, Long-Term Evolution ("LTE"), 3G, standards based on GSM/EDGE and/or UMTS/HSPA, Wi-Fi, IEEE 802.11 standards, GPSR, local area networking protocols, wide area networking protocols, Bluetooth, microwave, similar wireless communications protocols, or a combination of two or more thereof.

In certain embodiments, communications devices 110 each operate on unique radio frequency range. For example, communications devices 110a and 110b may be configured to operate on the VHF (i.e. 30-300 MHz) and UHF (i.e. 300 MHz to 3 GHz) radio frequency bands, respectively, and thereby allow modular communications system 100 to exhibit multi-band/broadband functionality (discuss further below).

Radio specific adaptors 118 demountably, intermittingly, and conductively couple communications devices 110 to hub 130. For example, handheld or man-portable radios can be paired with hub 130 given the right radio specific adapter ("RSA") 118. In other words, each particular type of communications device 110 requires a specific RSA 118. In certain embodiments, modular communications system 100 utilizes multiple communications devices 110 simultaneously to thereby facilitate communication via multiple RF frequencies. For example, communications devices 110a and 110b can be coupled to hub 130 via RSAs 118a and 118b, respectively, and communicate simultaneously. In certain aspects, transmission lines conductively coupled to antenna elements 140 terminate at hub 130.

As used herein, the term "modularity" refers to an ability of RSA 118 to demountably couple to different subsets of antenna elements 140a, 140b, 140c, and 140d via hub 130. For example, in embodiments where eight (8) antenna elements 140 are positioned on the apparel item 120 (e.g., three in the back, three in the front, and two on the shoulders). If the user desires to restrict use to the front antennas, the RSA can be reconnected to the appropriate ports on hub 130 associated with the front antennas. In the same vein, when usage of the rear-facing antennas is desired, the user can change the hub 130 ports connected to that particular RSA 118. The ability to selectively utilize different subsets of antenna elements 140, 142, 144, and 146 allows one to change the radiation pattern of system 100.

Antenna elements 140 have a reduced visual signature (e.g., less than 2 mm thick) to address identification and entanglement issue. Here, since antenna elements 140 extend no more than 2 mm from the surface of apparel item 120, they have a reduced probability of entanglement with structures external to the modular communications system 100. In other embodiments, antenna elements 140 exhibit a gain greater than 0 dB and are positioned at various locations on modular communications system 100 to achieve an omnidirectional RF radiation pattern that body worn antennas known in the art cannot achieve (such as the radio mounted whip antenna). Transmission lines 240 can be embedded in apparel item 120 in a manner that reduces their ability to interfere with user movements. For example, transmission lines 240 can be embedded between two substrate layers inaccessible to the user of apparel item 120.

In some embodiments, antenna elements 140 of a particular operational frequency (e.g., frequency A) can be exchanged with other antenna elements 140 having a different operational frequency (e.g., frequency B). The fungibility of antenna elements 140 allows modular communications system 100 to generate or alter RF frequency coverage and RF radiation patterns thereof to meet individual needs, inclinations, and/or specifications. In addition, the quantity of antenna elements 140 included in modular communications system 100 can be varied depending on the radio and mission requirements. For example, antenna element 140a is demountably coupled at location A of modular communications system 100 and operates at X frequency band is reversibly decoupled from hub 130.

Subsequently, antenna element 140b, which operates at Y frequency band, is demountably coupled to hub 130 at location A, which thereby alters the operational frequency of modular communications system 100. Alternatively, antenna element 140c, which operates at Z frequency band, is demountably coupled to hub 130 at location B, which thereby alters the operational frequency and the radiation pattern of modular communications system 100.

Figure 2:
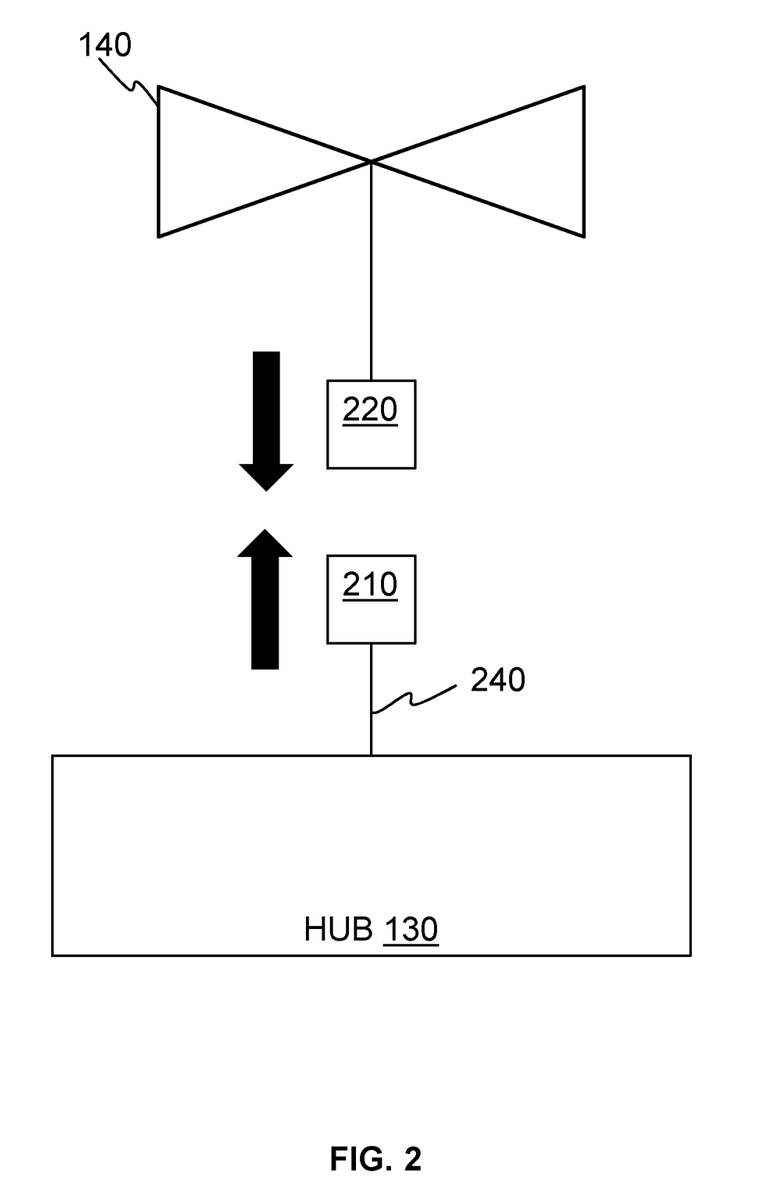
FIG. 2 illustrates pairing elements demountably engaging each other, in accordance with an embodiment of the present invention.

FIG. 2 depicts pairing elements 210 and 220 demountably engaging each other, in accordance with some embodiments. Antenna elements 140 are each communicatively coupled to a pairing element 220. Pairing element 220 can be a complementing component of a mating system. Hub 130 is conductively coupled to one or more copies of pairing element 210. Pairing element 210 complementarily engages pairing element 210 and thereby forms the aforementioned mating system. Pairing elements 210 and 220 facilitates RF wave propagation between hub 130 and antenna element 140.

In some aspects, hub 130 is coupled to each pairing elements 210 via a transmission line 140. Transmission line 140, for example, may be affixed to one or more internal and/or external surfaces of the apparel item 120. In other aspects, pairing elements 210 and 220 demountably engage each other when shifted in a common plane, which thereby forms a selective, intermitting, and conductive coupling therebetween. In still other aspects, pairing elements 210 and 220 form a conductive hook-and-loop mating system when engaged. For example, individual hooks and loops can be formed using a conductive composition. The conductive composition can, in some embodiments, include one or more polymers and fully exfoliated single sheets of graphene that form a three dimensional percolated network within the polymer having nanoscale separation between the individual sheets.

Figure 3:
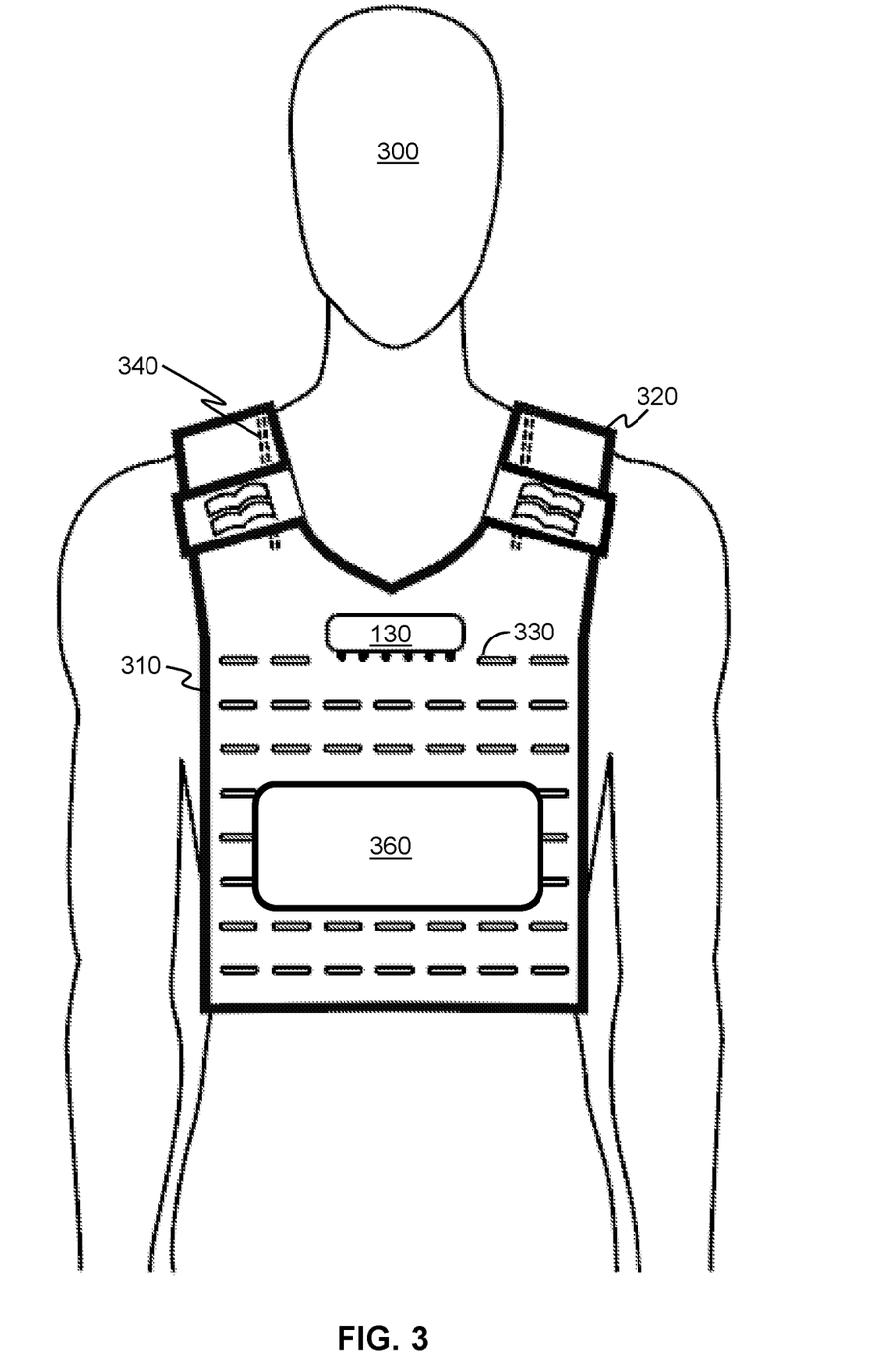
FIG. 3 illustrates a front view of the modular communications system positioned on a user, in accordance with an embodiment of the present invention.
Figure 4:
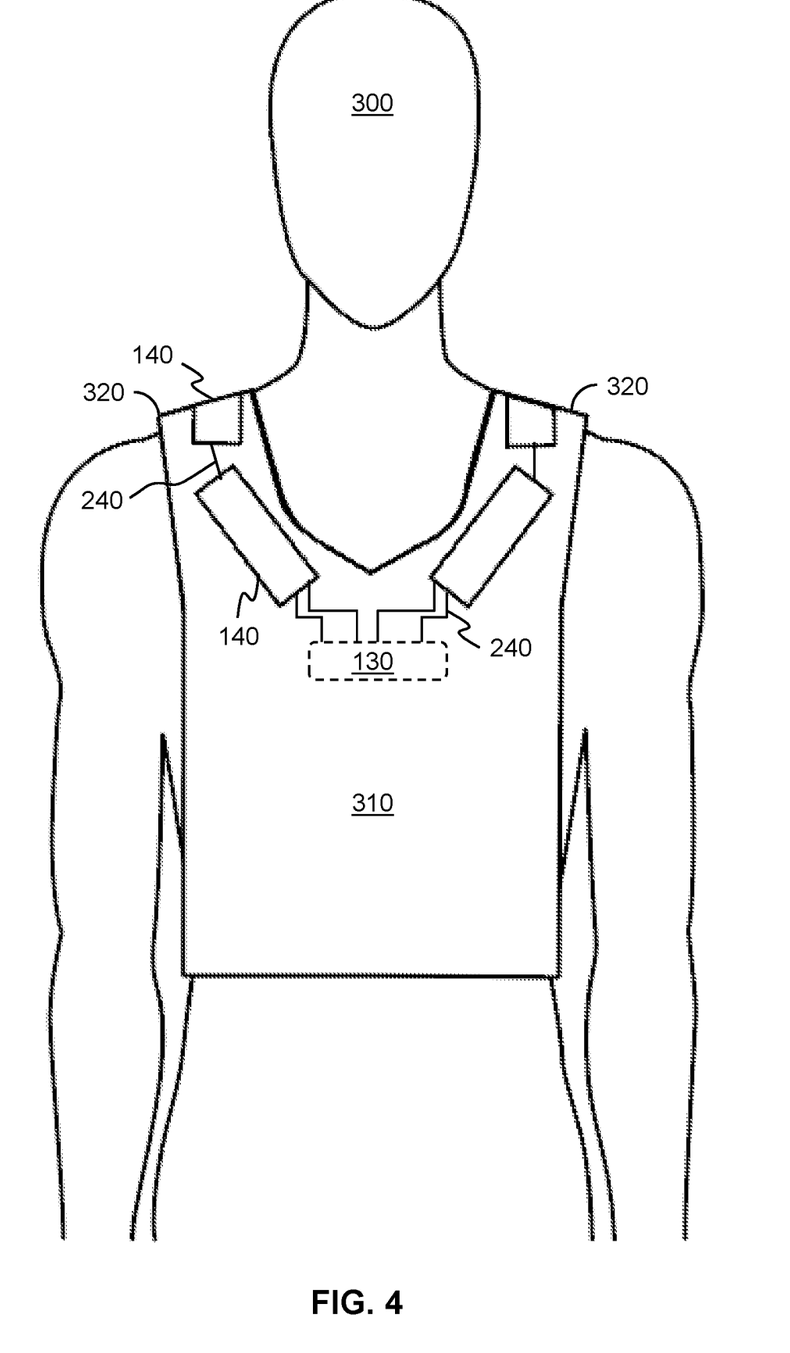
FIG. 4 depicts a front view of the modular communications system with an exposed subsurface and antenna elements positioned thereon, in accordance with an embodiment of the present invention.
Figure 5:
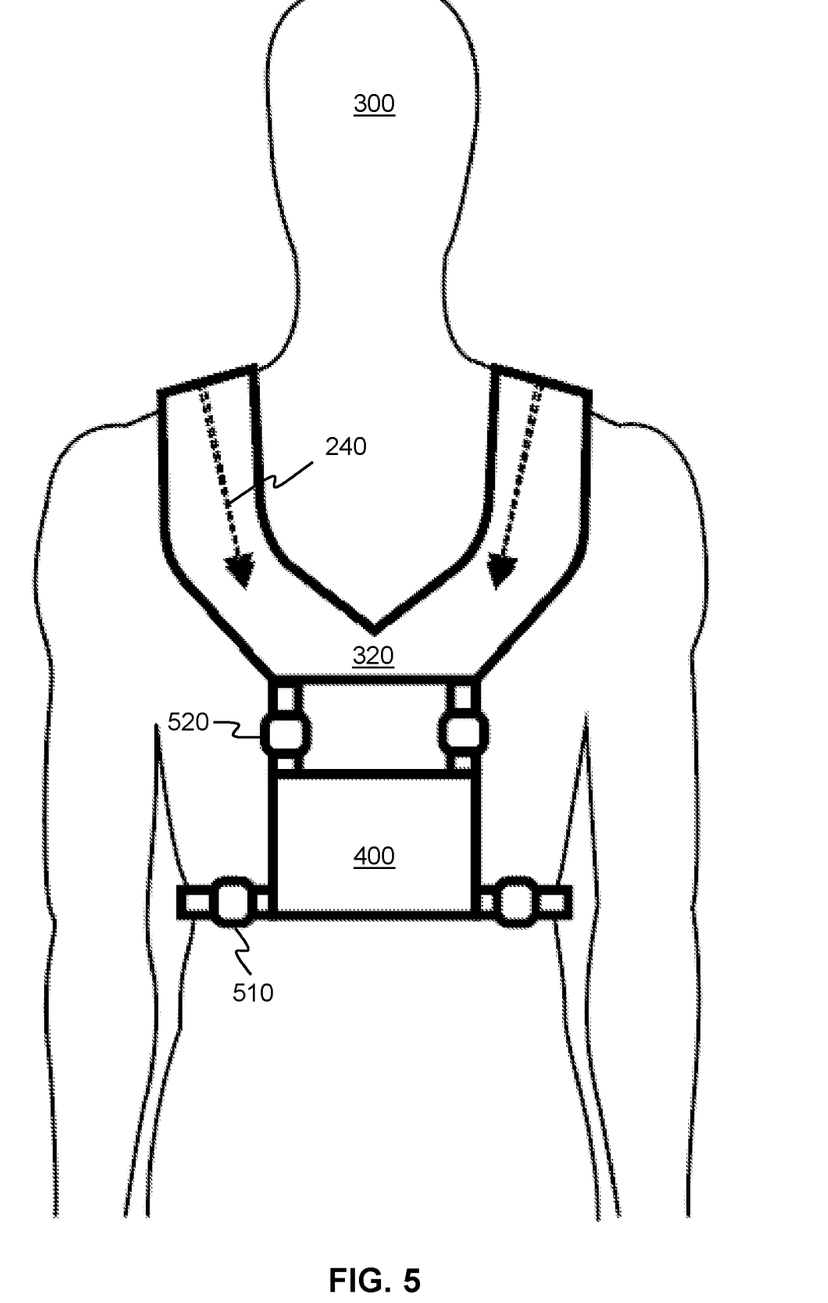
FIG. 5 depicts a back view of the modular communications system positioned on the user, in accordance with an embodiment of the present invention.
Figure 6:
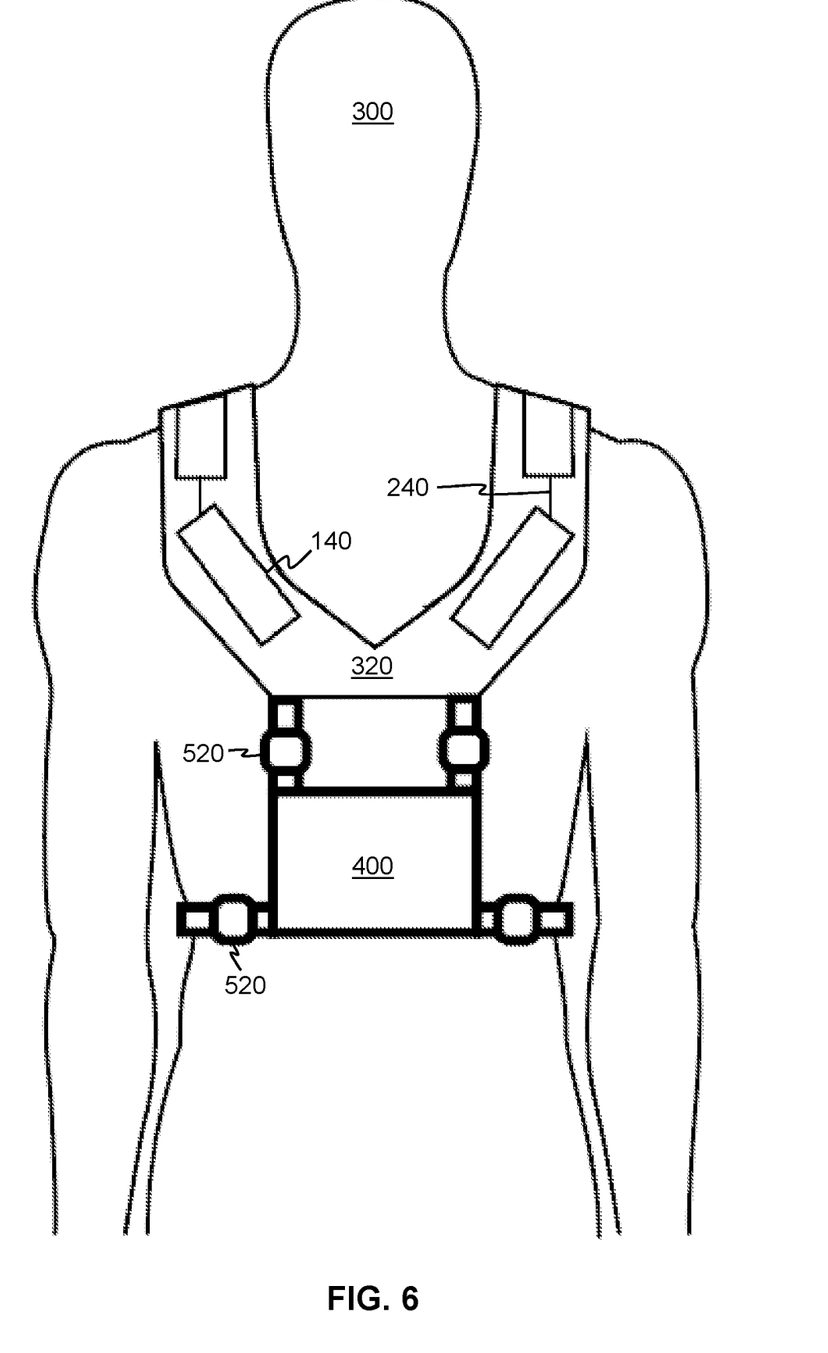
FIG. 6 depicts the back view of the modular communications system with a subsurface exposed and antenna elements positioned on the exposed subsurface, in accordance with an embodiment of the present invention.

FIG. 3 depict a front view of modular communications system 100 positioned on user 300, in accordance with certain embodiments. Similarly, FIG. 4 depicts a front view of an exposed subsurface of the modular communications system 100 and antenna elements 140 positioned thereon, in accordance with other embodiments. FIG. 5 depicts a back view of modular communications system 100 positioned on user 300, in accordance with some embodiments. Similarly, FIG. 6 depicts the back view of the base layer of the modular communications system 100 and antenna elements 140 positioned thereon, in accordance with certain embodiments. In some aspects, apparel item 120 includes primary portion 310 demountably affixed to abutting element 400 via fastener 510. Element 400 selectively secures primary portion 310 to user 300. Primary portion 310 can include one or more halo elements 320 extending therefrom. When worn by user 300, halo elements 320 are positioned proximate to the chest, upper shoulder, and/or upper back regions of user 300. Halo elements 320 preferably include one or more antenna elements 140 demountably attached thereto, for example, via pairing elements 210 and 220. In preferred embodiments, enclosure 360 is demountably affixed to an external surface of primary portion 310. In certain embodiments, communications device 110 is stored within enclosure 360.

In other embodiments, abutting element 400 selectively secures primary portion 310 to one or more regions of user 300 (e.g., to the torso of user 300). For example, abutting element 400 can include one or more substrates, arms, handles, platforms, panels and fasteners. Abutting element 400 is adjustably affixed to primary portion 310 via one or more straps that allow user 300 to position modular communications 100 as desired.

In certain aspects, RSA 118 is configured for use with man portable communication devices known in the art (e.g., communications device 110) having external antenna ports (not pictured). In other aspects, hub 130 includes a plurality of antenna ports, for example, at least 8 antenna ports, each conductively coupled to a different transmission line 240. Transmission lines 140 are preferably routed through (i.e. within) apparel item 120 and terminate at a particular pairing element 210. In other embodiments, transmission lines 140 are affixed on the surface of apparel item 120. In preferred embodiments, pairing elements 210 and 220 are demountably coupled together, which allows for antenna elements 140 replacement (e.g., when a change in operating frequency change is desired or damage to the current antenna element 140 occurs it can be replaced). Antenna elements (e.g., antenna element 140) may be positioned within apparel item 120.

To substantially achieve a 360° (i.e., omnidirectional) radiation pattern, antenna elements 140 are symmetrically attached to halo element 320 via pairing elements 220. To substantially achieve a directional radiation pattern, antenna elements 140 can be asymmetrically attached to halo element 320 via pairing elements 220.

Example 1

A wearable item 120 in the form of a looped restraint harness was made from 1000 denier coated Cordura®. In accordance with preferred embodiments, apparel items 120 is made from material that exhibits cut resistance, waterproofing, fire resistance, chemical resistance, optical reflectivity, or a combination thereof. In certain embodiments, wearable item 120 exhibits waterproofing characteristics that at least adhere to IEC standard 60529, which is hereby incorporated herein by reference; mechanical protection (i.e. cut, puncture, and abrasion resistance) characteristics that at least adhere to ANSI/ISEA 105 standards, which are hereby incorporated herein by reference; fire/flash/thermal exposure resistance characteristics at least adhering to the standards reflected in NFPA 2112, which are hereby incorporated herein by reference; chemical resistance characteristics that at least adhere to NFPA Standard 1991, which are hereby incorporated herein by reference; and/or reflective/visibility characteristics at least adhering to ANSI/ISEA 107-2015. These mechanical characteristics of the material allows the modular communications system 100 to perform in challenging environments where exposure to extreme temperatures, fire/flash/thermal exposure, chemical spills, and/or wet/water-logged environments is common.

Enclosure 360 is preferably a semi-rigid structure configured to store at least one man portable communications system (e.g., communications device 110). Enclosure 360 is preferably positioned on primary platform 310 using a demountable fastener, for example, MOLLE-compatible fasteners, fasteners, hook-and-loop systems, or any suitable demountable affixing elements known in the art. Enclosure 360 should be positioned about apparel item 120 in a manner to complement user 300's ability to move (e.g., chest area, underneath an arm, lower lumbar area, other upper torso area, and combinations thereof). Enclosure 360 can be fabricated using a variety of materials, which can include, but is not limited to cloth, woven material, natural materials, synthetic materials, polymers, elastomers, as well as similar woven and/or unwoven substrates.

In yet still other embodiments, apparel item 120 is the combination of two or more apparel items, which thereby increases the RF reception area (e.g., the area to which antennas elements 140 is affixed). For example, lower frequency (i.e. 3 to 30 MHz) antennas are typically larger in area thereby allowing such antennas elements to fit onto, for example, pants, trousers, shorts, or other apparel items worn on lower extremities.

According to preferred embodiments, adjacent antenna elements 140 are not positioned close enough to one another to cause RF interference (i.e. performance degradation) with one another. Adjacent antenna elements 140 are positioned at least ½ wavelength apart to reduce RF interference between them. Not to be restricted by theory, when antenna elements are positioned closer than ½ wavelength it causes movement of electrons in neighboring antenna elements. Here, the RF signal is not inducing electron movement, but rather such movement would be influenced by the other (i.e. adjacent) antenna element. The electron movement caused by the neighboring antenna element is termed "interference." As used herein, the term "null area" refers to a distance of up to a half wavelength from the antenna element 140 and the gain is less than −3 dBi in any particular direction.

In certain embodiments, antenna elements 140 have a gain of 1-5 dBi. For example, such RF signal characteristics are desirable since antenna elements 140 (e.g., antenna elements 140) that have a gain of −3 dBi or less in a particular direction exhibit a reduced ability to induce interference with neighboring antennas element 140.

Enclosure 360 and/or apparel item 120 include multilayered components and allow for insertion of ¾" closed-cell polypropylene foam between the layers, in accordance with other embodiments. The foam can provide separation of antenna from user's body to reduce RF interference. For example, the bottom foam layer (e.g., the foam layer closest to the body) can also be lined with conductive material, such as aluminum or copper foil, or material coated with graphene, silver, copper conductive ink, to provide additional RF isolation and RF shielding from the user's body to reduce the specific absorption rate (SAR). As such, the conductive material reflects RF radiation that emanates from antenna 140 away from the user's 300 body.

RSA 118 are demountably coupled to hub 130. For example, the specific type of RSA 118 compatible with communication devices 110 is determined by the number of external antenna ports included in communications device 110. For example, a communications device 110 that includes three (3) external antenna ports utilizes a different type of RSA 118 compared to computer devices 110 that include four (4) external antenna ports. RSAs 118 preferably splits and combines RF signals based on the number of inputs available to communications device 110.

In some embodiments, RSA 118 increases the gain of antenna element 140 by up to 20 dB. For example, RSA 118 can include a splitter conductively coupled to two different antenna elements 140 (e.g., antenna elements 140a and 140b). Here, RSA 118 can receive a RF signal transmitted from communications device 110 and transmit that signal to antenna elements 140a and 140b.

In contrast, RSA 118 use of filters only allows a particular range of frequencies to pass through (e.g., 2.1-2.6 GHz only). In other embodiments, RSA 118 includes a diplexer that receives RF signals from two different antennas (e.g., antenna elements 140c and 140d) and combines them to increase the strength of RF signals received via communications device 110. In certain embodiments, RSA 118 includes a high power amp to receive outgoing signals from communications device 110 and increase the amplitude thereof using a voltage differential applied to the high power amp. For example, a voltage of 3.3 volts can increase the gain of a signal up to 20 dB. In the same vein, RSA 118 includes a conventional low noise amplifier to increase the amplitude of incoming RF signals with a voltage differential applied thereto, in accordance with certain aspects. Continuing, RSA 118 incudes, in yet still other aspects, circulators, which include a low noise amplifier and a high power amplifier).

Transmission lines in hub 130 preferably terminate to 50 Ohm loads to avoid coupling. By way of example, non-transmitting/non-receiving antenna elements 140 are considered "open" and can cause reflections that interfere with radiating antenna elements 140. In other embodiments, RSA 118 includes a status check indicator (e.g., conveyed via I/O device 114) to convey proper connections of antenna elements 140 to ports/communications devices 110. For example, I/O device 114 can measure the amount of impedance on the port (i.e. capture impedance readings). For example, ports having an impedance greater than 1 Mohm typically reflect that there are no antenna elements attached/conductively coupled thereto.

Whereas ports having impedance readings of a 30-70 ohm can reflect that antenna elements are attached thereto. I/O devices 114 preferably generate notifications when captured impedance readings are great than 1 Mohm. For example, the notifications can be a visual indicator and/or audible transmission conveying caution or the presence of an issue (e.g., red or similar visual indicator as well as a beep/click/buzz/vibration or similar audible indicator). I/O devices 114 preferably generate notifications when captured impedance readings are 30-70 ohm. For example, the generated notification can be a visual indicator and/or audible transmission conveying acceptance (e.g., green or similar visual indicator as well as a beep/click/buzz/vibration or similar audible indicator). If the ports are not connected to an antenna then the RSA will indicate to the user that the ports are not properly connected.

In some embodiments, transmission lines 140 embedded in apparel item 120 and terminate at pairing elements 210 at one end and the antenna ports of hub 130 on other end. Transmission lines 140 are preferably routed in a manner to not interfere with user's 300 movements. In certain embodiments, hub 130 is positioned up to 24 inches from enclosure 360 to allow for a loss of up to 0.2 ohms between the hub 130 and communications devices 110. Note that cable loss is not uniform and typically varies across different types of transmission lines 240).

In yet still other embodiments, pairing elements 210 and 220 are "low profile" (e.g., a width and length of up to 5 mm and up to 20 mm, respectively) demountable fasteners—such as SMB, MCX, MMCX, u.FL. Pairing elements 210 and 220 preferably exhibit one or more of the following characteristics: a maximum engagement force of 65 N; a minimum disengagement force of 2 N; an electrical resistance of up to 0.2 ohms; an insertion loss of up to 0.5 dB; a power rating greater than 2 W. Such performance characteristics can result in a reduction of the physical and/or perceived emotional effort required to engage and/or disengage pairing elements 210 and 220.

In some aspects, transmissions lines 240 are coaxial cables, wave guides, printed transmissions lines, similar conductive structures/objects, or a combination thereof. For example, transmission lines 240 and/or antenna elements 140 can have a radius of curvature of 0.5-3 inches to thereby allow system 100 to substantially conform to the contours of the user without a statistically significant (e.g., greater than 0.5 dB) loss in performance. In some aspects, transmission lines have fire retardant properties (e.g., LMR-100A-FR, FBT-200, UL 1666, and CSA FT4).

Referring now to the aforementioned example, pairing elements 210 can be female snap connectors, which are two part crimp connectors. For example, the mating end thereof can be affixed to a back end with crimps. Pairing elements 210 can be attached to antenna elements 140 subsequent to printing but prior to sealing the antenna element 140. For example, antenna element 140 is preferably sealed with fabric. For example, two back ends with crimps of the connector can be punched through from the ink side (i.e. the side to which the ink is applied) of antenna element 140 at pairing element 210 and crimped together with the mating parts of the connector on the PET side (i.e. back of antenna element 140) using plyers.

In addition to snap connectors (female and male), other types of pairing elements can be utilized, such as conductive hook and loop, magnetic aligned contact pin, twist lock and screw fit connectors, similar demountable fasteners, or a combination of two or more thereof according to other embodiments. Pairing elements 210 and 220 preferably has one or more of the following characteristics: electrical resistance of up to 0.2 ohms; a maximum engagement force of 12-15 lbs.; a minimum disengagement force of 7-9 lbs.; an insertion loss of up to 0.5 dB; and a height of up to 10 mm. According to preferred embodiments, antenna element 140 is a dipole. In other embodiments, antenna element 140 is a patch antenna, monopole antenna, Yagi antenna, log-periodic antenna, slot antenna, array antenna, other antenna configuration, or combinations thereof. Antenna elements 140 can be configured to operate within a one or more frequencies, including, but not limited to, HF, VHF, UHF, L, S, C, X, Ku, K, Ka, V, W, mm, A, B, C, D E, F, G H, I, J, K, L, and M.

In preferred embodiments, antenna elements 140 are printed on PET using a graphene polymer-based composition ("conductive composition"). Alternatively, antenna elements could also be printed using other polymer-based conductive inks that contain metals that include, but are not limited to, silver, copper, carbon, nickel, or a combination thereof. Increase in resistance results in a decrease in antenna element 140 performance efficiency. As used herein, "antenna efficiency" is defined as the ratio of power delivered to antenna element 140 versus the power radiated therefrom. Here, an increase in electrical resistance decreases the amount of power available for radiation, which thereby decreases antenna element 140 performance efficiency. Antenna elements 140 are preferably screen printed using graphene and conductive polymer-based inks on 5 mil thick PET sheets.

To be sure, 5 mil is the minimum thickness of PET that will not warp when exposed to the curing temperatures. In certain embodiments, antenna element 140 has a conductivity of 0.2-1.5 Ohms/sq. Antenna element 140 is preferably cured subsequent to printing. Antenna element 140 can be configured to be a single band or multiband antenna according to preferred embodiments.

In certain embodiments, antenna element 140 is an antenna array. For example, use of such antenna arrays could provide system 100 with a statistical increase in gain, directionality, and circular polarization. Such antenna arrays include a variety of antenna types, including, but not limited to, dipole antennas, patch antennas or other planar antenna element designs suitable for use in antenna arrays. Such antenna arrays are preferably configured to include a single connection conductively coupled to transmission line 240 such that power input from transmission line 240 to the antenna array is split to the antenna elements 140 of the array. Alternatively, such antenna arrays may be configured to include multiple connections conductively coupled to multiple transmission lines 240.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

As various modifications could be made in the constructions and methods herein described and illustrated without departing from the scope of the invention, it is intended that all matter contained in the foregoing description or shown in the accompanying drawings shall be interpreted as illustrative rather than limiting. Thus the breadth and scope of the present invention should not be limited by any of the above-described exemplary embodiments, but should be defined only in accordance with the following claims appended hereto and their equivalents.

What is claimed is:

1. A modular communications systems comprising:
   an apparel item comprising:
     a surface;
     a foam layer positioned therein;
   a plurality of landing pads positioned proximate to the surface, each landing pad of the plurality of landing pads uniquely positioned on the surface relative to other landing pads of the plurality of landing pads;
   a plurality of non-metallic antenna elements each:
     demountably, intermittingly, and conductively coupled to a unique landing pad of the plurality of landing pads;
     comprising a non-metallic conductive composition;
     comprising a unique operational frequency compared to at least one antenna element of the plurality of antenna elements;
   a hub positioned on the surface and conductively coupled to each of the landing pads;
   a plurality of communications devices, wherein each communications device:
     is demountably affixed to the surface;
     intermittingly, demountably, and conductively coupled to the hub;
     comprises an operational frequency;
   wherein the hub intermittingly, demountably, and conductively couples each of the communications devices to one of the landing pads; and
   wherein the foam layer is lined with a conductive material; and
   wherein the conductive material reflects radiofrequency radiation that emanates from the plurality of non-metallic antenna elements.

2. The modular communications system of claim 1, wherein
   each of the plurality of antenna elements comprises a first pairing element, the first pairing element is conductive;
   each of the plurality of landing pads comprises a second pairing element, the second pairing element is conductive; and
   the first conductive pairing element and the second conductive pairing element demountably engage each other when shifted in a common plane and thereby form the selective, intermitting, and conductive coupling.

3. The modular communications system of claim 2, wherein one or more of the first pairing element and the second pairing element consist of the non-metallic conductive composition.

4. The modular communications system of claim 3, wherein the first pairing element and the second pairing element engage when shifted in a common plane with a maximum engagement force of 65 N.

5. The modular communications system of claim 4, wherein the first pairing element and the second pairing element disengage when shifted in a same plane with a minimum disengagement force of 2 N.

6. The modular communications system of claim 1, wherein
   each of the plurality of antenna elements comprises a first pairing element, the first pairing element is conductive;
   each of the plurality of landing pads comprises a second pairing element, the second pairing element is conductive; and wherein the first pairing element and the second pairing element form a conductive hook-and-loop mating system when engaged.

7. The modular communications system of claim 1, further comprising:
an enclosure;
wherein
the enclosure is positioned on the surface via a demountable fastener; and
at least one of the plurality of communications devices is stored within the enclosure.

8. The modular communications system of claim 1, wherein
an antenna element of the plurality of antenna elements comprises a conductive composition; and
the conductive composition comprises a polymer and fully exfoliated single sheets of graphene.

9. The modular communications system of claim 8, wherein the fully exfoliated single sheets of graphene are present within the polymer as a three-dimensional percolated network comprising nanoscale separation between individual fully exfoliated single sheets of graphene.

10. The modular communications system of claim 1, wherein
the hub comprises a first coupling element
each communication device comprises a second coupling element; and
wherein the first coupling element and the second coupling element form a wedge-like intermitting and conductive coupling therebetween.

11. The modular communications system of claim 1, wherein each of the antenna elements comprises a radius of curvature of between 0.5 and 3 inches.

12. The modular communications system of claim 1, further comprising:
an I/O device positioned proximate to the surface;
wherein
each of the plurality of communications devices is intermittingly, demountably, and conductively coupled to the hub via an adaptor element that captures an impedence reading thereof;
the adaptor captures the impedence reading; and
I/O device generates a notification when the impedence reading is within a threshold range and thereby convey that the impedence reading reflects a conductive coupling.

13. The modular communications system of claim 1, wherein the plurality of non-metallic antenna elements comprise an antenna array.

14. The modular communications system of claim 1, wherein one or more of the plurality of antenna elements comprise a height of up to 10 mm.

15. The modular communications system of claim 1, wherein
the apparel item comprises a first apparel item and a second apparel item.

16. The modular communications system of claim 1, wherein the apparel item comprises:
a primary portion; and
an abutting element coupled to the primary portion thereby securing the primary portion to a user of the modular communications system.

17. A modular communications systems comprising:
an apparel item comprising:
a surface;
a foam layer positioned therein;
a plurality of landing pads positioned proximate to the surface, each landing pad of the plurality of landing pads uniquely positioned on the surface relative to other landing pads of the plurality of landing pads;
a plurality of non-metallic antenna elements each:
demountably, intermittingly, and conductively coupled to a unique landing pad of the plurality of landing pads;
comprising a non-metallic conductive composition;
comprising a unique operational frequency compared to at least one antenna element of the plurality of antenna elements;
a hub positioned on the surface and conductively coupled to each of the landing pads;
a plurality of communications devices, wherein each communications device:
is demountably affixed to the surface;
intermittingly, demountably, and conductively coupled to the hub;
comprises an operational frequency;
wherein the hub intermittingly, demountably, and conductively couples each of the communications devices to one of the landing pads;
wherein the foam layer is lined with a conductive material;
wherein the plurality of non-metallic antenna elements comprise an antenna array; and
wherein the conductive material reflects radiofrequency radiation that emanates from the plurality of non-metallic antenna elements.

18. The modular communications system of claim 17, wherein
each of the plurality of antenna elements comprises a first pairing element, the first pairing element is conductive;
each of the plurality of landing pads comprises a second pairing element, the second pairing element is conductive; and
the first conductive pairing element and the second conductive pairing element demountably engage each other when shifted in a common plane and thereby form the selective, intermitting, and conductive coupling.

19. The modular communications system of claim 18, wherein
an antenna element of the plurality of antenna elements comprises:
a conductive composition;
a height of up to 10 mm;
the conductive composition comprises a polymer and fully exfoliated single sheets of graphene;
the fully exfoliated single sheets of graphene are present within the polymer as a three-dimensional percolated network comprising nanoscale separation between individual fully exfoliated single sheets of graphene; and
each of the antenna elements comprise a radius of curvature of between 0.5 and 3 inches.

20. The modular communications system of claim 19, wherein the plurality of non-metallic antenna elements comprise an antenna array.

* * * * *